No. 700,350. Patented May 20, 1902.
A. MAIN.
BICYCLE BRAKE.
(Application filed Jan. 6, 1902.)
(No Model.)
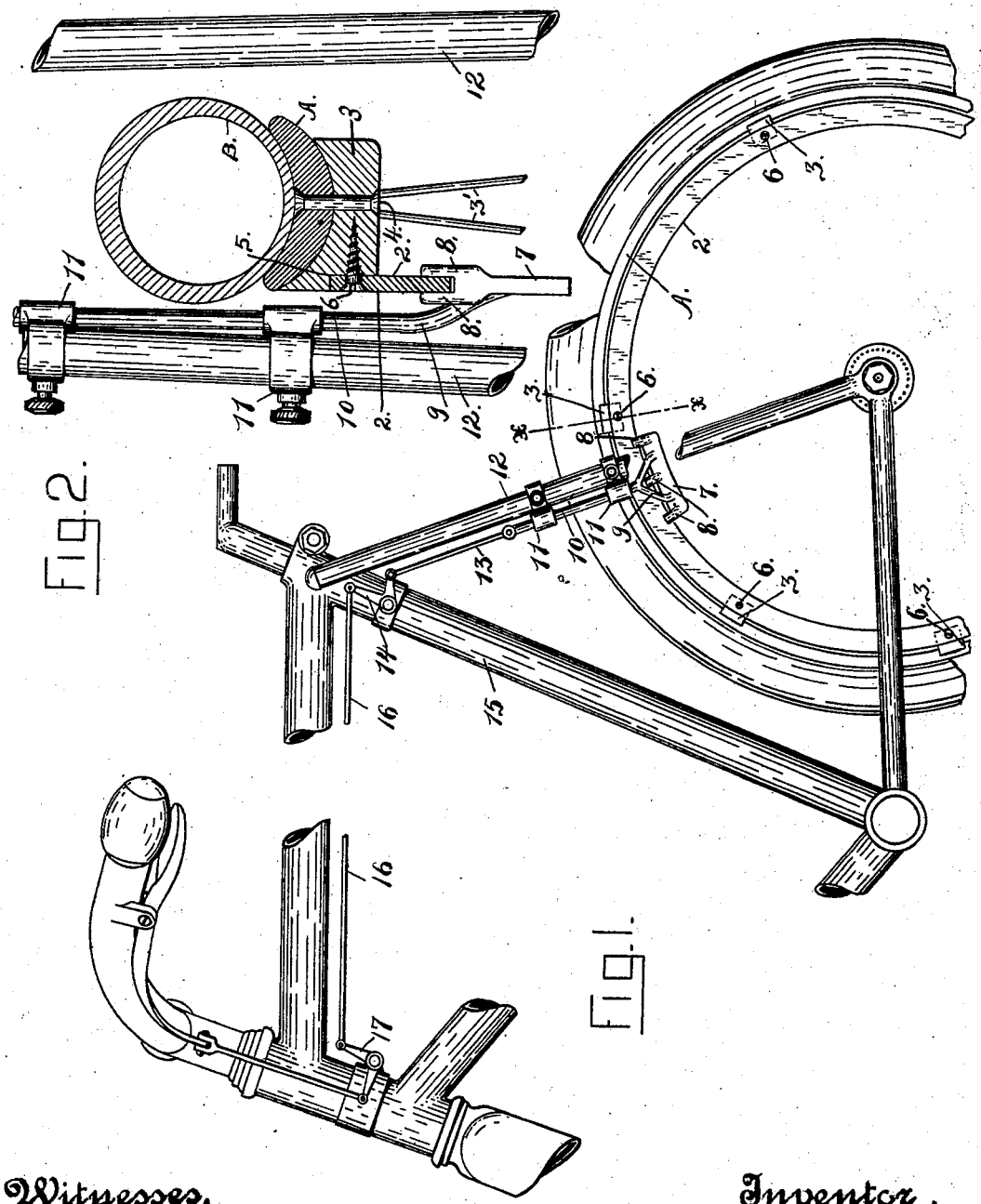

UNITED STATES PATENT OFFICE.

ALBERT MAIN, OF POWELLTON, CALIFORNIA.

BICYCLE-BRAKE.

SPECIFICATION forming part of Letters Patent No. 700,350, dated May 20, 1902.

Application filed January 6, 1902. Serial No. 88,533. (No model.)

*To all whom it may concern:*

Be it known that I, ALBERT MAIN, a citizen of the United States, residing at Powellton, county of Butte, State of California, have invented an Improvement in Bicycle-Brakes; and I hereby declare the following to be a full, clear, and exact description of the same.

My invention relates to improvements in brakes for bicycles and means for operating the same.

It consists of a rim or flange, means for fixing it within the rim or felly of the wheel and at one side of the spokes, a brake-shoe, and mechanism by which it can be drawn into contact with the rim at the will of the rider.

It also comprises details of construction which will be more fully explained by reference to the accompanying drawings, in which—

Figure 1 is a side elevation of a bicycle with parts broken away to show the manner of attaching the brake. Fig. 2 is a sectional view taken through the line $x\,x$ of Fig. 1.

As shown in the drawings, A is the felly or rim of a bicycle-wheel having the usual or any suitable tire B and the radial spokes 3', by which the rim is held concentric with the hub of the wheel. In my invention I employ a rim 2 of somewhat smaller diameter than the rim or felly A, and in conjunction with this rim I use lugs 3, which are fitted to the inner periphery of the rim or felly A, and these lugs are firmly secured to the felly by bolts, as at 4, or equivalent securing devices. The lugs extend between any two of the spokes and may be as many as six, more or less, equally spaced around the inner periphery of the felly.

The lugs 3 have a groove or channel formed in their outer periphery, as shown at 5, and the inner periphery of the rim 2 fits into this channel, so that the outer face of the rim is approximately flush with the outer edges of the lugs, thus making a smooth finish when the parts are in place. The rim is screwed or bolted to the lugs, as shown at 6, and is in this manner firmly united to and revoluble with the wheel.

The brake-shoe 7 is adapted to press against the inner periphery of the rim 2 and has upon it lugs or flanges 8, which fitting over the inner periphery of the rim 2 on both sides serve to hold the brake-shoe in proper relation with the rim at all times. The brake-shoe is connected by a forked arm 9 with a guide-rod 10, from which the forks 9 diverge, and this guide-rod is slidable through guides 11, secured to the rear fork 12 of the bicycle-frame. A rod or cord 13 connects the slidable rod 10 with a bell-crank lever 14, here shown as pivoted to the seat-post guide 15, and from this another rod or wire 16 extends forward and connects with a bell-crank lever or other equivalent operating device, as at 17. This device is preferably fixed upon or near the handle-bar of the machine, so that the rider has it under easy control, and by movement of the controlling hand-lever the power is transmitted through the various connections to draw the brake-shoe 7 against the inner periphery of the rim 2 with any desired degree of pressure. This pressure being always at right angles with the axle of the wheel will be resisted by the journal-bearings of the wheel, and no undue strain will be brought upon any portion of the wheel.

The supplemental rim relieves the tires of all the wear which is usually brought upon them by the use of brakes acting directly upon their surface, and it also prevents the wear and disfigurement of the rim or felly of the wheel, which will occur if the shoe is caused to press upon that.

Having thus described my invention, what I claim, and desire to secure by Letters Patent, is—

1. The combination in a bicycle-brake of a rim independent of and interior to the felly of the wheel, lug and bolt connections between the rim and felly and securing one to the other, a brake-shoe operating upwardly against the rim and engaging the latter at right angles with the axle of the machine, and means for operating the brake-shoe.

2. The combination with a bicycle-wheel of lugs fixed at intervals within the wheel-felly and having channels upon the exterior angle, a rim fitting said channels and bolted thereto, having its inner periphery of smaller diameter and clear of the lugs and felly, a brake-shoe curved to fit said inner periphery having guide-lugs upon opposite sides, a guided slidable rod connected with the shoe and connections between said rod and a hand-lever by which the shoe may be forced into contact with the interior of the rim.

3. The combination with a bicycle-wheel of a rim, lugs fixed to the interior of the wheel-felly by which the rim is supported within the felly and at one side of the wheel-spokes with the inner periphery independent thereof, a brake-shoe curved to fit said periphery having guides upon each side, a rod guided and slidable upon a wheel-frame having forks by which it is united with the brake-shoe, a bell-crank lever, a cord connecting it with the slidable rod, a hand-lever at the bicycle-head and a cord connecting it with the bell-crank lever whereby the brake-shoe may be caused to press against the interior of the annular rim and at right angles with the wheel-shaft.

In witness whereof I have hereunto set my hand.

ALBERT MAIN.

Witnesses:
S. H. NOURSE,
CHAS. E. TOWNSEND.